United States Patent
Williams

(10) Patent No.: US 7,860,631 B2
(45) Date of Patent: Dec. 28, 2010

(54) ENGINE SPEED CONTROL FOR A LOW POWER HYDROMECHANICAL TRANSMISSION

(75) Inventor: Keith R. Williams, Minnetonka, MN (US)

(73) Assignee: Sauer-Danfoss, Inc., Ames, IA (US)

( * ) Notice: Subject to any disclaimer, the term of this patent is extended or adjusted under 35 U.S.C. 154(b) by 1054 days.

(21) Appl. No.: 11/608,392

(22) Filed: Dec. 8, 2006

(65) Prior Publication Data

US 2008/0139363 A1 Jun. 12, 2008

(51) Int. Cl.
*G06F 19/00* (2006.01)
*G06F 7/00* (2006.01)
*G06F 17/00* (2006.01)

(52) U.S. Cl. .............................. 701/54; 701/51; 701/53; 701/58; 701/60; 701/61; 701/67; 477/52; 477/62; 477/115; 477/118; 477/156; 192/3.31

(58) Field of Classification Search .................... 701/51, 701/53, 54, 58, 60, 61, 67; 477/52, 62, 115, 477/118, 156; 192/3.31
See application file for complete search history.

(56) References Cited

U.S. PATENT DOCUMENTS

| | | | |
|---|---|---|---|
| 3,620,319 A | | 11/1971 | Armasow et al. |
| 3,722,324 A | * | 3/1973 | Cordner et al. ............... 475/75 |
| 3,815,698 A | * | 6/1974 | Reed .......................... 180/6.48 |
| 3,842,694 A | * | 10/1974 | Marlow ......................... 477/69 |
| 3,890,360 A | * | 6/1975 | Pruvot et al. ................... 60/431 |
| 3,901,031 A | | 8/1975 | Knapp et al. |
| 3,914,938 A | | 10/1975 | Cornell et al. |
| 3,969,896 A | * | 7/1976 | Louis ........................... 60/431 |
| 4,091,617 A | | 5/1978 | Cornell |
| 4,131,035 A | * | 12/1978 | Mizuno et al. ................. 477/68 |
| 4,261,229 A | * | 4/1981 | Mizuno et al. ................. 477/68 |
| 4,350,058 A | * | 9/1982 | Miller et al. ................. 477/154 |
| 4,351,152 A | * | 9/1982 | Reynolds et al. .............. 60/395 |
| 4,395,199 A | | 7/1983 | Izumi et al. |
| 4,515,041 A | * | 5/1985 | Frank et al. ................... 477/43 |
| 4,663,990 A | * | 5/1987 | Itoh et al. ...................... 477/43 |
| 4,788,892 A | * | 12/1988 | Komoda et al. ............. 477/120 |
| 4,807,495 A | * | 2/1989 | Wallace ........................ 477/98 |
| 4,842,089 A | * | 6/1989 | Kimbrough et al. ......... 180/413 |
| 4,901,529 A | | 2/1990 | Iino et al. |
| 4,973,295 A | | 11/1990 | Lee |
| 5,160,245 A | * | 11/1992 | Geringer ...................... 417/218 |
| 5,390,759 A | * | 2/1995 | Gollner ....................... 180/307 |
| 5,540,051 A | * | 7/1996 | Maruyama et al. ............ 60/438 |
| 5,636,119 A | * | 6/1997 | Coutant et al. ................ 701/51 |
| 5,774,820 A | * | 6/1998 | Linden et al. ................. 701/93 |
| 6,067,795 A | * | 5/2000 | Iino et al. ..................... 60/327 |
| 6,250,077 B1 | | 6/2001 | Iino et al. |
| 6,253,140 B1 | * | 6/2001 | Jain et al. ..................... 701/67 |

(Continued)

*Primary Examiner*—Khoi Tran
*Assistant Examiner*—Jaime Figueroa

(57) ABSTRACT

A method of operating a transmission of a vehicle. The method includes determining an open loop ratio percentage from an engine RPM input signal and a brake input signal using a first algorithm. Determining a closed loop ratio percentage from the engine RPM input signal, a vehicle RPM input signal and a throttle input signal using a second algorithm. Summing the open loop percentage and closed loop ratio percentage to calculate a ratio command percentage that is used to sum with a swashplate input to actuate a swashplate positioner and operate the transmission.

11 Claims, 3 Drawing Sheets

U.S. PATENT DOCUMENTS

| | | | |
|---|---|---|---|
| 6,278,926 B1* | 8/2001 | Jain et al. .................... 701/58 |
| 6,280,152 B1 | 8/2001 | Sugiura et al. |
| 6,343,470 B1 | 2/2002 | Nanri et al. |
| 6,378,300 B1 | 4/2002 | Johnson et al. |
| 6,385,520 B1* | 5/2002 | Jain et al. .................... 701/51 |
| 6,481,314 B2 | 11/2002 | Nemoto et al. |
| 6,848,530 B2* | 2/2005 | Tani ......................... 180/292 |
| 6,852,064 B2 | 2/2005 | Carlson et al. |
| 6,942,596 B2 | 9/2005 | Carlson et al. |
| 7,180,720 B2* | 2/2007 | Ichimura ................... 361/178 |
| 7,344,473 B2* | 3/2008 | Ishibashi et al. ............. 477/52 |
| 2002/0111731 A1* | 8/2002 | Jain et al. .................... 701/56 |
| 2003/0034006 A1* | 2/2003 | Richard et al. ............. 123/352 |
| 2003/0195684 A1* | 10/2003 | Martens ...................... 701/41 |
| 2004/0014557 A1* | 1/2004 | Carlson et al. ............... 477/37 |
| 2004/0118365 A1* | 6/2004 | Brueckmueller ........... 123/56.3 |
| 2004/0251067 A1* | 12/2004 | Gray et al. ................. 180/165 |
| 2005/0085979 A1* | 4/2005 | Carlson et al. ............... 701/51 |

* cited by examiner

ENGINE SPEED CONTROL FOR A LOW POWER HYDROMECHANICAL TRANSMISSION

BACKGROUND OF THE INVENTION

This invention relates to an engine speed control. More specifically, this invention relates to a method of using a control algorithm to improve the operation of a transmission.

Previous Control Algorithms for low power hydromechanical transmissions (HMTs) on small horsepower (<50 Hp) vehicles have proven to be lacking in responding to external loads and operator inputs in certain modes. These external loads include varying terrain, wheel slip conditions, and pulling loads. Operator inputs include throttle adjustments and braking changes. The goal for a control is for an operator to set a desired engine speed using the throttle and have the transmission control system adjust the transmission ratio to maintain that desired engine speed within limits as the external loading changes. When the vehicle speed is adjusted by the transmission ratio and does not match the desired vehicle speed for the operator, the operator must then make a manual adjustment of the Throttle.

Current transmissions using belt CVT's are open loop mechanical controls and are designed to handle these changes in operating conditions and operator inputs by responding to load as well as engine speed. Digital controls are either open loop or closed loop and typically respond only to engine speed. For optimum driving conditions a vehicle needs to reach near maximum engine torque quickly during accelerations and maintain this torque level at the engine crankshaft as the external loading and vehicle speed changes. A closed loop engine speed control alone does this adequately and so does an open loop engine speed with antistall algorithm as long as external loading does not vary rapidly. However, when extreme external load variations occur the current HMT systems cause the engine speed to vary beyond those of belt CVT's.

For an automotive controller, the throttle sets the maximum engine torque level for a given Throttle position and engine speed. At any throttle position, the transmission must adjust its ratio between drive shaft speed and engine speed to apply the commanded engine torque to the drive wheels including while accelerating or when experiencing variable external loading. The transmission ratio is adjusted in a way that attempts to keep engine speed nearly constant for a given constant throttle position. As the external torque loading increases, the transmission ratio must be reduced. As the external torque loading decreases then the ratio must be increased. Therefore, transmission ratio is increased if engine speed exceeds throttle set target speed and reduces ratio if engine speed is less than throttle set target speed.

Closed loop engine speed controls are sometimes used to operate the controller. During commanded engine speed-ups, torque loading is desired to increase at the drive shaft while continuously increasing the speed of the vehicle. During decelerations, the torque may decrease at the Engine output shaft and can actually change direction so that the engine absorbs torque from the transmission. Thus, the engine torque absorption is limited to a level typically less than 25% of accelerating torque for the same engine speed. Under conditions of deceleration with closed loop engine speed control, the transmission ratio is commanded to stay the same or increase without a throttle command. This results in engine speed staying high or over-speeding as the engine is unable to absorb all the torque at its output shaft. Therefore, the change in transmission ratio must continue to decrease to affect a timely stopping of the vehicle.

An open loop engine speed algorithm works to slow the vehicle down and prevent engine over-speeding because the algorithm does not tend to add transmission ratio when the throttle is released. However, when the throttle is reapplied while the vehicle is slowing down, the transmission ratio must decrease slightly from its current position or stay the same momentarily to allow the engine speed and torque to respond to the throttle command. This is necessary in order to increase transmission output torque and to accelerate the vehicle smoothly. Thus, present open loop control algorithm implementations require complicated logic to accomplish desired control with slow response resulting in delay of engine speed recovery during throttle reapplication.

Thus, it is a principal object of the present invention to provide an improved controller that provides for smooth driving conditions.

Yet another object of the present invention is to provide a controller that is able to process a plurality of input signals to accommodate an operator's input.

Another object of the present invention is to provide a method of operating a transmission that varies the ratio between the input and the output of a transmission without load influence.

These and other objects, features, or advantages of the present invention will become apparent from the specification and claims.

BRIEF SUMMARY OF THE INVENTION

A method of operating a transmission. The method includes providing a controller that is able to receive a plurality of input signals including swashplate position, vehicle RPM, engine RPM, brake position, and throttle position signals. The controller then determines an open loop ratio percentage based upon the engine RPM signal and the brake signal by using a first algorithm while determining simultaneously a closed loop ratio percentage from the engine RPM signal, the vehicle RPM signal, and the throttle signal with a second algorithm. The first and second algorithms are then summed in order to calculate a ratio command percentage that is summed with a previously determined swashplate input to determine a swashplate error percentage. By using this swashplate error percentage and digital logic the controller is then able to actuate a swashplate positioner based upon the swashplate error percentage to operate the transmission.

DETAILED DESCRIPTION OF THE PREFERRED EMBODIMENT

Figure 1:
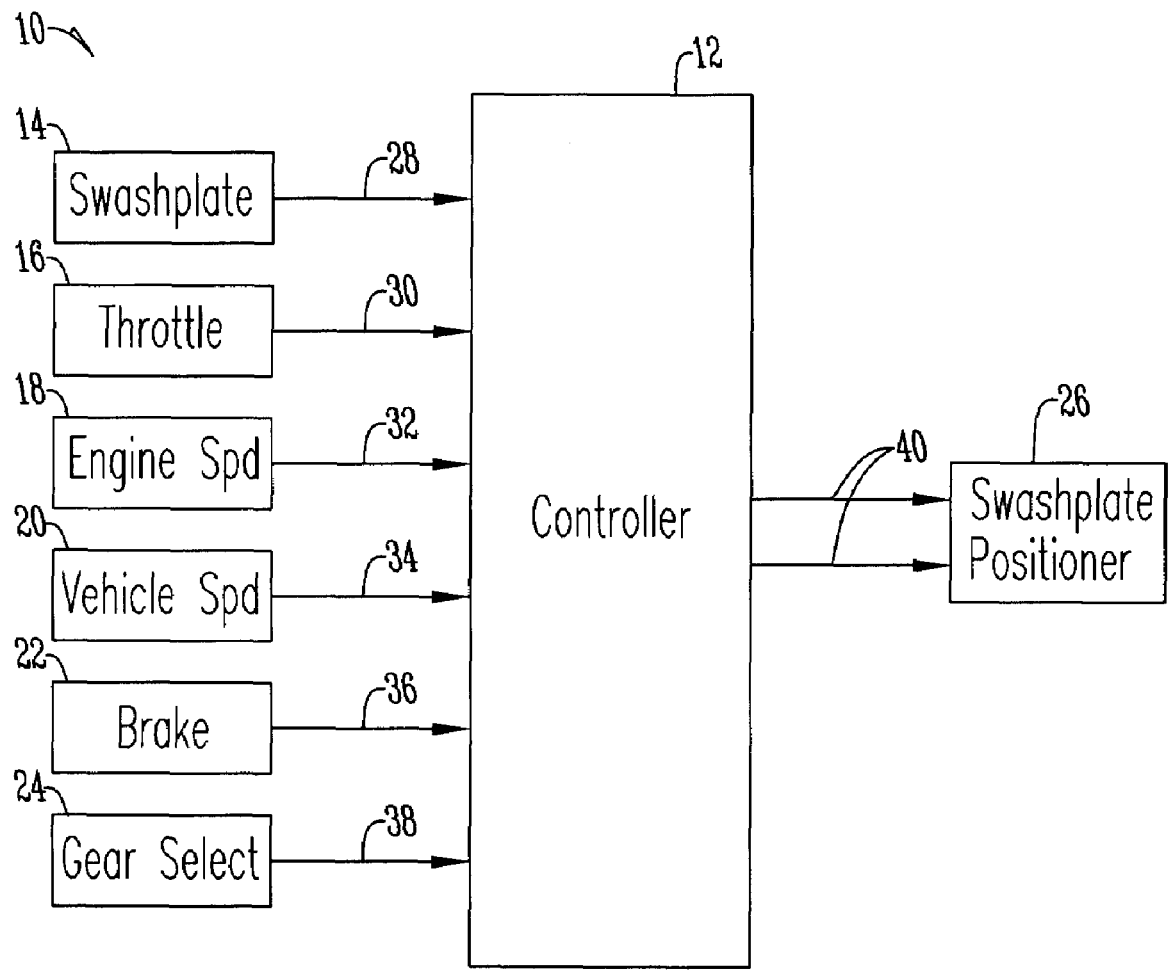
FIG. 1 is schematic diagram of a sensor input and motor drive output for a controller.

FIG. 1 shows and electronic transmission control system 10 having a controller 12 that receives a plurality of input signals from a swashplate sensor 14, a throttle sensor 16, an engine speed sensor 18, a vehicle speed sensor 20, a brake sensor 22, and a gear select sensor 24 to provide an output to a swashplate positioner 26. In one embodiment the swashplate positioner is a DC motor. For the purposes of this description the input signals are considered a swashplate input signal 28, a throttle input signal 30, an engine speed RPM input signal 32, a vehicle speed RPM input signal 34, a brake input signal 36, and a gear select signal 38 whereas the output signals are considered a control output signal 40.

Figure 2:
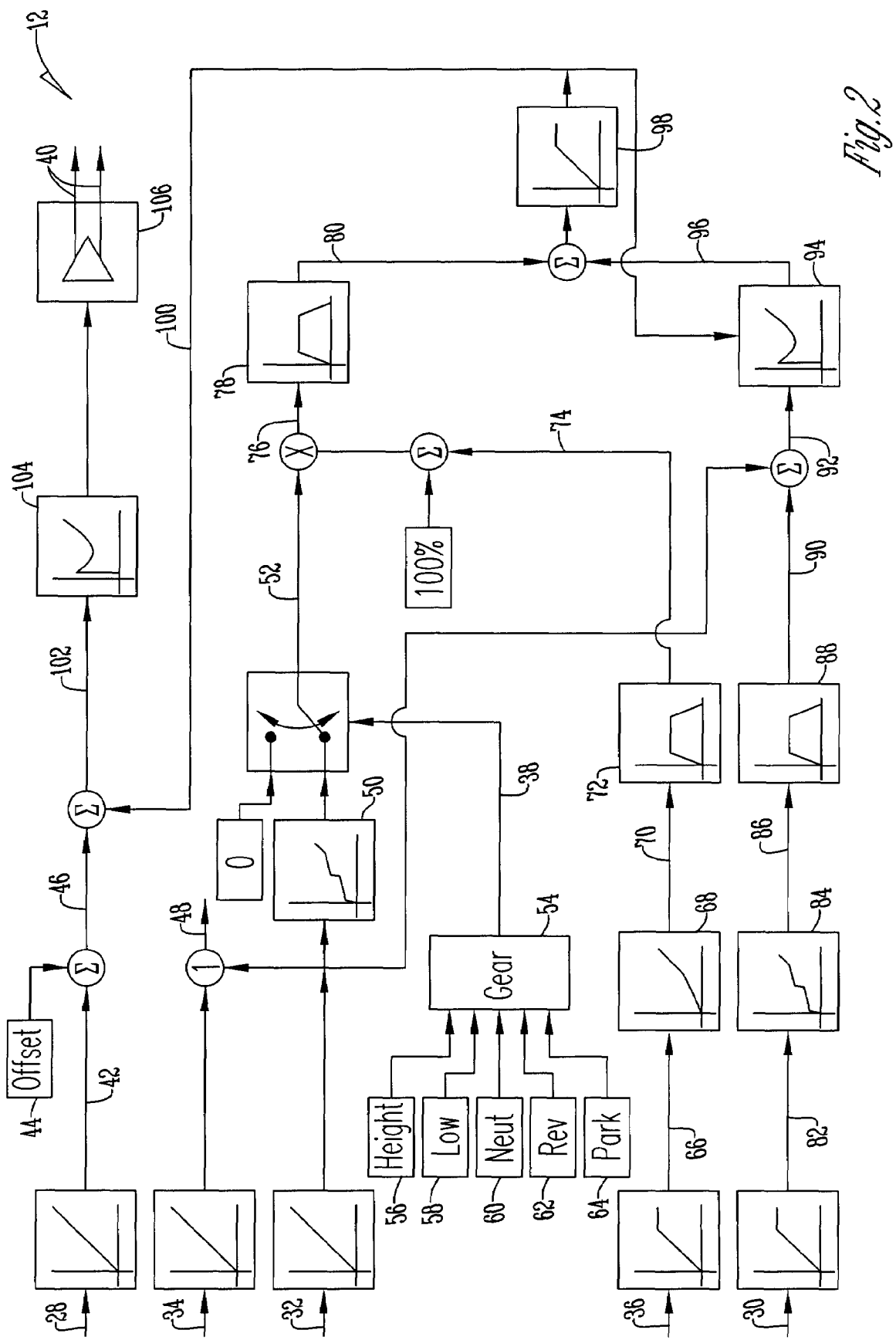
FIG. 2 is a schematic diagram of the control system of a controller.

FIG. 2 shows a schematic diagram of a first and second control algorithm used in combination with a swashplate input in order to provide the controller output signal 40. The swashplate input is created by providing the swashplate input signal 28 that the controller 12 is programmed to convert into a swashplate percentage 42 that is summed with a predetermined offset to create a swashplate with offset percentage 46 that represents the swashplate input of the controller 12. Thus, by detecting the angle of the swashplate with the swashplate sensor 14 the controller is able to constantly provide a swashplate input as represented by numeral 46.

As the controller 12 continually determines the swashplate input the controller also is continuously receiving the vehicle speed signal and engine speed signal 34, 32 that constantly provide a transmission ratio 48 for the transmission. Additionally, the engine signal 32 is implemented into a profile function 50 that when used in combination with the gear select signal, is used to provide an engine set point 52. The gear select signal 38 is determined by the actuation of a range box 54 by an operator. The operator using the range box 54 may place the transmission in a high forward gear 56, a low forward gear 58, a neutral position 60, a reverse position 62, or into park 64. Thus, depending on the position of the range box and the engine speed, the engine set point 52 is determined by the controller 12.

Meanwhile, in the controller the brake input signal 36 is analyzed to provide a brake percentage 66 that is implemented into a brake profiling function 68 to produce a brake output percentage 70 that is inputted into a brake ramping function 72 to produce a ramped brake percentage 74. The ramped brake percentage 74 is then summed with a hundred percent by the controller 12 and inputted into the engine set point 52 to provide an engine brake set point 76. The engine brake set point 76 is then provided into an open loop ratio ramping function 78 that provides an open loop ratio percentage 80. The functions and calculations 50-78 all represent inputs, calculations, and functions of a first algorithm within the controller 12. Thus, the first algorithm uses the engine RPM input signal 32 and the brake input signal 36 in order to determine an open loop ratio percentage 80. The open loop ratio percentage 80 represents an open loop ratio adjustment.

The controller 12 additionally has a second algorithm that analyzes throttle input signal 30. The throttle input signal 30 when introduced by the controller 12 and is analyzed to provide a throttle percentage 82 that is implemented in a throttle profile function 84 to produce a throttle RPM 86 that is inputted in a throttle ramping function 88 to produce a throttle limited RPM signal 90. This is then summed with the engine speed RPM signal 32 to determine an engine speed error 92. By inputting the engine speed error 92 into digital logic 94 a closed loop ratio percentage 96 is determined by the second control algorithm. Thus the second control algorithm uses the throttle input signal and the engine speed RPM signal to determine a closed loop ratio percentage 96. As with the open loop ratio percentage 80, the closed loop ratio percentage 96 represents a closed loop ratio adjustment.

At this point the open loop ratio percentage 80 is summed with a closed loop ratio percentage 96 and inputted into a limiting function 98. The limiting function 98 acts to ensure that the ratio command percentage 100 that results from the summation of the open loop ratio percentage 80 and the closed loop ratio percentage 96 is within predefined limits.

Figure 3:
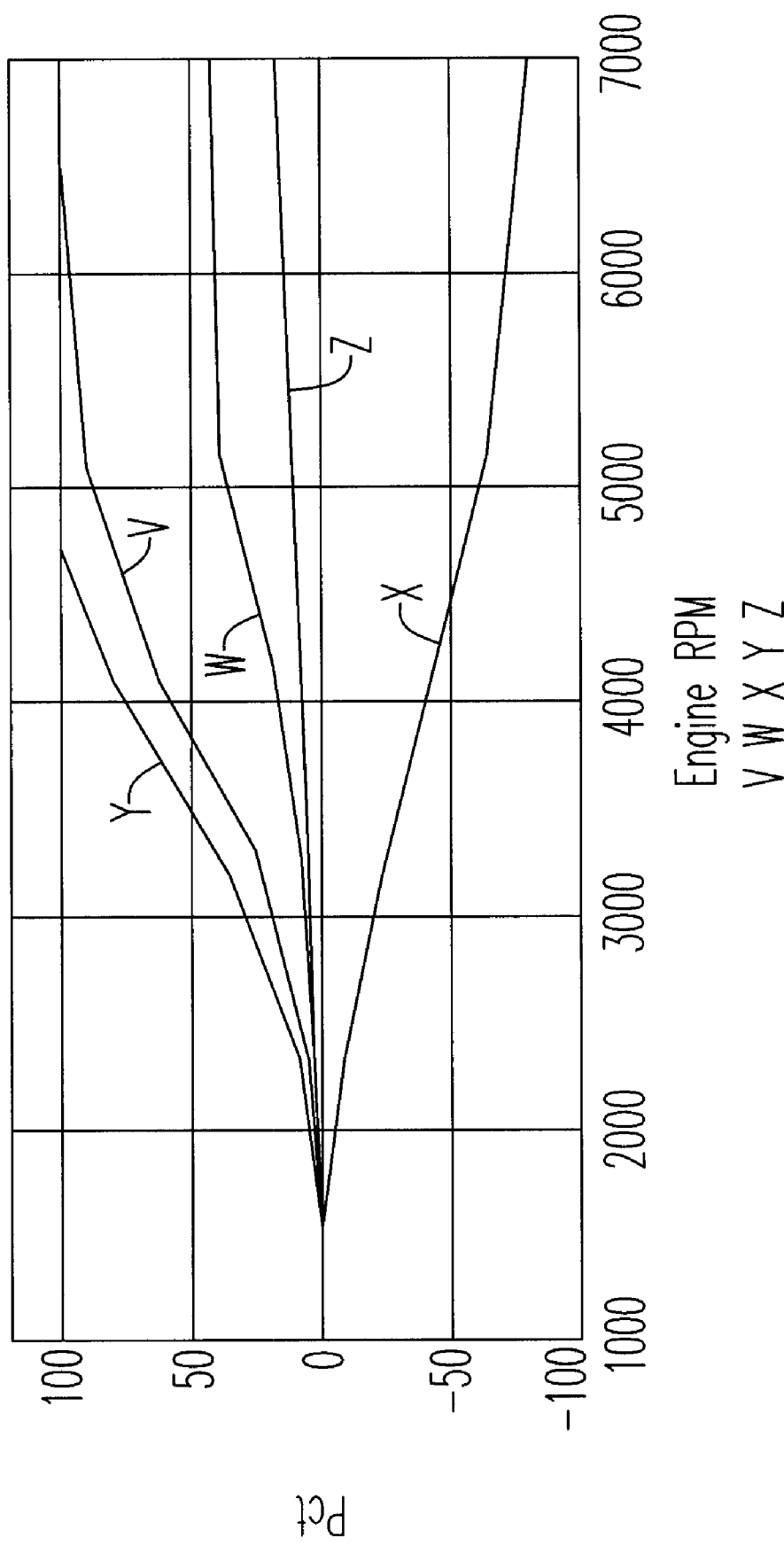
FIG. 3 is a graph of engine RPM versus ratio command percentage when the engine RPM equals the throttle RPM.

FIG. 3 shows a graph of ratio command limits when the engine RPM equals the throttle RPM. As shown in this graph the open loop set percentage V, the closed loop upper limit W and the closed loop lower limit X are used to determine the maximum output Y and the minimum output Z.

If the summation of the open loop ratio percentage 80 and closed loop ratio percentage 96 exceeds either of the predefined limits of the limiting function 98 communicates with the digital logic 94 to provide a new closed loop ratio percentage 96 to ensure the predefined limits are not exceeded.

Once the ratio command percentage 100 falls between the predetermined limits the ratio command percentage 100 is summed with the swashplate with offset percentage 46 to determine a swashplate error percentage 102. Then using digital logic 104 the controller actuates a current source 106 to adjust the current and voltage and hence the control output signal 40 to the swashplate positioner 26 to actuate the positioner 26 and operate the vehicle.

Thus, the electronic transmission control system 10 is designed to achieve a transmission ratio based on the operator inputs and the current vehicle operating conditions. While the system 10 in one embodiment is used for HMTs, in other embodiments the system 10 is used with pure hydrostatic transmissions, with multi-mode HMT's, or any other transmission system that provides an infinitely variable transmission ratio from zero to maximum output speeds.

The system 10 is also optimized for ratio-controlled HMTs that require smooth start-ups. In such an arrangement, the transmission constantly connects the engine to the load, and the transmission ratio is only varied by a change in command from the electronic control system 10. The mechanical function of the transmission is solely to vary the ratio between its input and output without load influence. This is different from conventional transmissions that use a torque or load sensitive device, such as a slipping belt, centrifugal clutch, pressure-modulated clutch, torque converter, or the like to achieve a smooth startup condition.

Therefore this system 10 is well suited for use with dynamic operating conditions. In particular, the system 10 reacts quickly to rapidly changing load and operation characteristics. Further, the system 10 is well suited for use with high speed vehicles or other vehicles with a high output torque ratio. Though in a preferred embodiment the system 10 is intended for use with ATVs, in alternative embodiments the system 10 is use with other vehicles.

By implementing a closed loop engine speed control in conjunction with an open loop transmission ratio adjustment, the benefits of both are utilized. Thus, open loop control is tuned to provide desired large changes in transmission ratio commands whereas the closed loop response is tuned to provide smaller more precise changes in ratio command.

Therefore, the open loop transmission ratio adjustment uses the engine speed measurement to set a desired ratio setting. A ramping function 78 filters the desired ratio setting to limit the rate of change in actual ratio command during accelerations and decelerations and as engine speed changes due to external loading of the engine and changes in throttle settings. In general, the open loop transmission ratio command 80 is set to zero when engine speed is below a predefined engine startup speed and increases from 0% to 100% as engine speed increases. This curve defining open loop transmission ratio percentage 80 over the range of engine speed is set to provide good operating characteristics for both low speed operation and high speed operation under normal external loading conditions of flat and dry roads with smooth acceleration and deceleration between low and high speeds.

The separate setpoint curves and ramping are selected by gear selection using the range box 54. When gear selection is neutral 60 or park 64, the setpoint is always set to zero ratio. Forward low gear 58 and reverse 62 use one set of setpoint curve and ramp rates while forward high gear 56 uses another set of setpoint curve and ramp rates.

The error between actual engine speed and throttle setting is input into the closed loop engine speed control. The closed loop engine speed control increases the combined transmission ratio command under light external loading conditions such as decelerating or going down a hill when engine speed exceeds throttle setting. Closed loop engine speed control decreases the combined ratio command under higher loading conditions such as accelerating, going uphill, or pulling heavy loads when engine speed is lower than the throttle setting.

To control the range of output as the combined ratio command the sum of the two algorithms has a limiting function 98 to restrict the actual ratio command within predefined limits. These are based upon engine speed and throttle position as well as the mechanical ratio limits of 0-100% of maximum ratio. Higher transmission ratios result in higher vehicle speeds for a given engine speed but typically result in higher torques at the engine. This limit function also calculates the upper and lower limits that should be applied to the closed loop engine speed control. When the closed loop engine speed control violates either limit the function also resets the ratio control signal in the closed loop engine speed control function to maintain the limit that is violated. The closed loop engine speed control output is thereby limited in how much additional ratio is added to the open loop transmission ratio adjustment during decelerations.

During acceleration and external loading conditions the transmission ratio is allowed to be adjusted down in order to maintain the desired engine speed as set by the operator through the engine throttle adjustment mechanism. The upper limit W (FIG. 3) applied to the closed loop engine speed control is set as a percentage of the open loop transmission ratio. The upper limit W is added to the open loop ratio thus setting the total maximum actual ratio commanded. This is the "maximum" curve Y in FIG. 3. This is set by actual engine speed and the rate of change of the resulting open loop ratio setpoint. The percentage chosen also sets the maximum engine braking that is applied to decelerate the vehicle above the open loop transmission ratio setting and ramping. The smaller the percentage the more engine braking is applied. The higher the percentage the less the engine braking is applied.

The basic lower limit X (FIG. 3) applied to the closed loop engine speed control is set equal to the negative value of the open loop transmission ratio. Thus, the sum of the two, the combined ratio command, does not go negative but is limited to a zero ratio. An alternative to this that results in greater engine speed pull down is to set the lower limit X (FIG. 3) as a function of throttle setting. This is used when vehicles are required to maintain tractive effort while an operator maintains throttle command. With high throttle settings the engine is able to pull down under loading by preventing the combined transition ratio command from becoming zero. This is the low limit X in FIG. 3. This is set by the open loop ratio and the desired lower limit ratio for a given throttle setting. At low throttle settings the engine is allowed to pull down below throttle setting speed with a combined ratio command near zero.

Profile function 84 defines the desired engine speed setting vs. throttle sensor input 30 to the controller with a subsequent ramping function 88 to shape this setting with time. This ramped throttle setting is used as one of the inputs to the closed loop engine speed control. The profile and ramping are shaped to obtain the desired dynamic and steady state engine speed curves with operator input changes in throttle setting. Due to different gear ratios between forward high 56 and forward low 58 the actual response of the engine differs. Therefore the profile and ramp rates must be tuned for each gear selection. This is also true for the open loop transmission ratio settings. The gear selection is then used to change the parameters used within each of the profile and ramping functions 84 and 88.

The brake activation is monitored by a pressure sensor in the brake line or a brake position sensor which reports to the controller how much brake is being applied physically to the output shaft of the HMT via the vehicle wheels. This in turn loads the engine unless the ratio is reduced. The additional loading on the engine reduces the engine speed which in turn reduces the ratio by the open loop transmission ratio adjustment. However, this adjustment by itself proves to be too little resulting in a greater reduction in engine speed than desired. This occurs until the closed loop engine speed control algorithm can make the desired additional ratio reduction changes. Therefore, the brake sensor output is used to inform the controller that brake activation is commanded. The open loop ratio adjustment is reduced directly by an amount and rate corresponding to the brake input that is programmed into the software in order to maintain engine speed closer to desired level as set by the throttle sensor. By applying too much ratio reduction and applying it too quickly the engine speed can actually be increased with an increase in brake input. So a balance in both amount per given brake activation level and rate at which it is applied determined by the controller 12.

An engine startup condition with the range box 54 in gear requires that minimal external torque from the vehicle wheels be transmitted back to the engine output shaft. This minimal external loading occurs at the zero transmission ratio position. The controller 12 must therefore actively move the swashplate to the offset position when it determines that the engine is not running. When the engine is cranking under the starter, the engine loading is only that associated with turning the internal components of the HMT and the engine itself. Once the engine speed is sufficient to determine the engine has started, the controller 12 gradually increases the ratio to the level as prescribed by the open loop setpoint command level plus the closed loop control level as set by the actual engine speed, throttle setting, transmission ratio and brake setting. After the ramp up time has passed then the normal ramping levels are used. This allows an operator to move the machine following an engine startup sequence without any other actions such as shifting the range box 54 to neutral 60 or letting off the throttle for a period of time.

Gear selection changes while the vehicle is moving must be handled in a special way to prevent unwanted machine accelerations or decelerations. While the vehicle is moving, the transmission ratio is not zero and therefore a change in the range box selection results in a difference in speeds between each end of the range box 54. This is especially true when the change is from forward high 56 to forward low 58 or forward low 58 to forward high 56. Because the engine is the lower inertia component between the vehicle and engine, this change in speeds affects the engine more than the vehicle.

When shifting from forward low gear 58 to forward high gear 56, the input shaft from the HMT and the engine decelerates quickly. This can result in killing the engine. To maintain the same vehicle speed and engine speed the transmission ratio must decrease quickly by the amount of range box gear change. In order to effect this change in ratio when a gear selection is detected from forward low to forward high, the rate limited open loop transmission ratio is reduced by the gear ratio change from the ratio just prior to the gear shift change while the closed loop engine control output is cleared to zero.

When changing from forward high 56 to forward low 58 holding the ratio at the same position results in accelerating the engine, which is less objectionable then the opposite direction. Therefore the rate limited open loop transmission ratio is set to the same combined ratio prior to the gear shift and the closed loop engine control output is cleared to zero. The subsequent updating of both the open loop and closed loop components of the combined ratio command result in a smooth transition between gears.

Changes in gear selection to neutral 60 or park 64 results in ratio commands set to zero. Because this act disconnects the vehicle wheels from the engine via the range box 54, the mismatch of speeds is not critical to the operation of the machine. Going from neutral 60 or park 64 to a gear requires that the speeds of the input and output of the range box 54 match the gear ratio selected in the range box 54. The physical connection is not made until the speeds match and the clutches are able to engage in the range box 54. Until that occurs no appreciable torque is transmitted through the range box 54 between the vehicle wheels and engine while the clutches are disengaged. When a change from forward high 56 and forward low 58 gear occurs the appropriate parameters for desired profile setpoint and ramping curves must also be applied to the software functional components for the open loop transmission setpoint ratio and the throttle defined engine speed command.

Therefore, disclosed is an improved control system for a transmission. The system eliminates complex algorithms and commands and improves operation of the transmission. Thus, at the very least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of operating a transmission of a vehicle the steps comprising:

determining an open loop ratio percentage from an engine RPM input signal and a brake input signal using a first algorithm;

determining a closed loop ratio percentage from the engine RPM input signal, a vehicle RPM input signal and a throttle input signal using a second algorithm;

summing the open loop ratio percentage and the closed loop ratio percentage to calculate a ratio command percentage; and using the ratio command percentage to activate swashplate positioner.

2. The method of claim 1 wherein to activate the swashplate positioner the closed loop ratio percentage is summed with a swashplate input.

3. The method of claim 1 wherein the engine RPM input signal is inputted into a profile function to create an engine setpoint that is associated with the braking input signal to form an engine brake setpoint to determine the open loop ratio percentage with the first algorithm.

4. The method of claim 1 wherein profile and ramped functions are used on the throttle input signal with the second algorithm to determine the closed loop ratio percentage.

5. The method of claim 3 further comprising the step of inputting a gear selection command to the engine setpoint with a range box.

6. The method of claim 1 further comprising the step of providing a limiting function after summing the open loop ratio percentage and closed loop ratio percentage to restrict the ratio command percentage.

7. The method of claim 6 wherein the limiting function resets the closed loop ratio percentage.

8. The method of claim 1 wherein profile and ramped functions are used on the brake input signal with the first algorithm to determine the open loop ratio percentage.

9. The method of claim 2 wherein the swashplate input comprises a summed swashplate and offset percentage.

10. The method of claim 4 wherein the summed swashplate and offset percentage is summed with the ratio command percentage to determine a swashplate error percentage.

11. The method of claim 1 wherein the swashplate positioner is a DC motor.

* * * * *